(12) United States Patent  (10) Patent No.: US 8,108,376 B2
Okamoto et al.  (45) Date of Patent: Jan. 31, 2012

(54) INFORMATION RECOMMENDATION DEVICE AND INFORMATION RECOMMENDATION METHOD

(75) Inventors: Masayuki Okamoto, Kawasaki (JP); Masaaki Kikuchi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 314 days.

(21) Appl. No.: 12/407,827

(22) Filed: Mar. 20, 2009

(65) Prior Publication Data

US 2009/0248678 A1 Oct. 1, 2009

(30) Foreign Application Priority Data

Mar. 28, 2008 (JP) ................... 2008-086151

(51) Int. Cl.
*G06F 7/00* (2006.01)
*G06F 17/30* (2006.01)

(52) U.S. Cl. ........ 707/705; 707/736; 707/737; 707/739; 706/45; 706/46

(58) Field of Classification Search ........................ None
See application file for complete search history.

(56) References Cited

U.S. PATENT DOCUMENTS

| 6,263,334 | B1* | 7/2001 | Fayyad et al. | 707/737 |
| 2003/0154181 | A1* | 8/2003 | Liu et al. | 707/1 |
| 2004/0158558 | A1* | 8/2004 | Koizumi et al. | 707/3 |
| 2005/0044487 | A1* | 2/2005 | Bellegarda et al. | 715/511 |
| 2006/0179051 | A1* | 8/2006 | Whitney et al. | 707/5 |
| 2007/0136288 | A1* | 6/2007 | Shimada et al. | 707/7 |
| 2008/0033938 | A1 | 2/2008 | Okamoto et al. | 707/50 |
| 2008/0082521 | A1* | 4/2008 | Danielson et al. | 707/5 |
| 2008/0208847 | A1* | 8/2008 | Moerchen et al. | 707/5 |
| 2008/0301126 | A1* | 12/2008 | Asai | 707/5 |
| 2008/0319746 | A1 | 12/2008 | Okamoto et al. | 704/245 |

FOREIGN PATENT DOCUMENTS

| JP | 2003-167901 A | 6/2003 |
| JP | 2006-190128 A | 7/2006 |

* cited by examiner

*Primary Examiner* — Mohammad Ali
*Assistant Examiner* — Angelica Ruiz
(74) *Attorney, Agent, or Firm* — Ohlandt, Greeley, Ruggiero & Perle, L.L.P.

(57) ABSTRACT

A document set, and history documents including documents, etc., browsed by a user are input. The document set and the history documents are each analyzed to obtain characteristic vectors. A plurality of topic clusters and a plurality of sub-topic clusters are obtained by clustering the document set. A transition structure showing transitions of topics among the sub-topic clusters is generated, and a characteristic attribute is extracted from each topic cluster and each sub-topic cluster. An cluster-of-interest is extracted in comparison among characteristic vectors of the history documents and a characteristic vector of each document included in the document set, a sub-topic cluster having transition relations with the cluster-of-interest is obtained on the basis of a transition structure owned by the cluster-of-interest, and a document included in the sub-topic cluster is extracted as a recommended document to be presented together with the characteristic attribute.

19 Claims, 11 Drawing Sheets

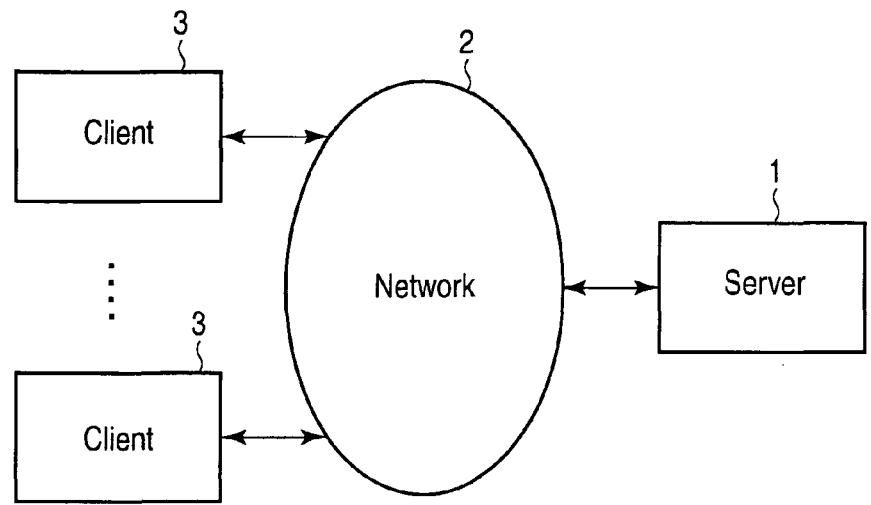
F I G. 1
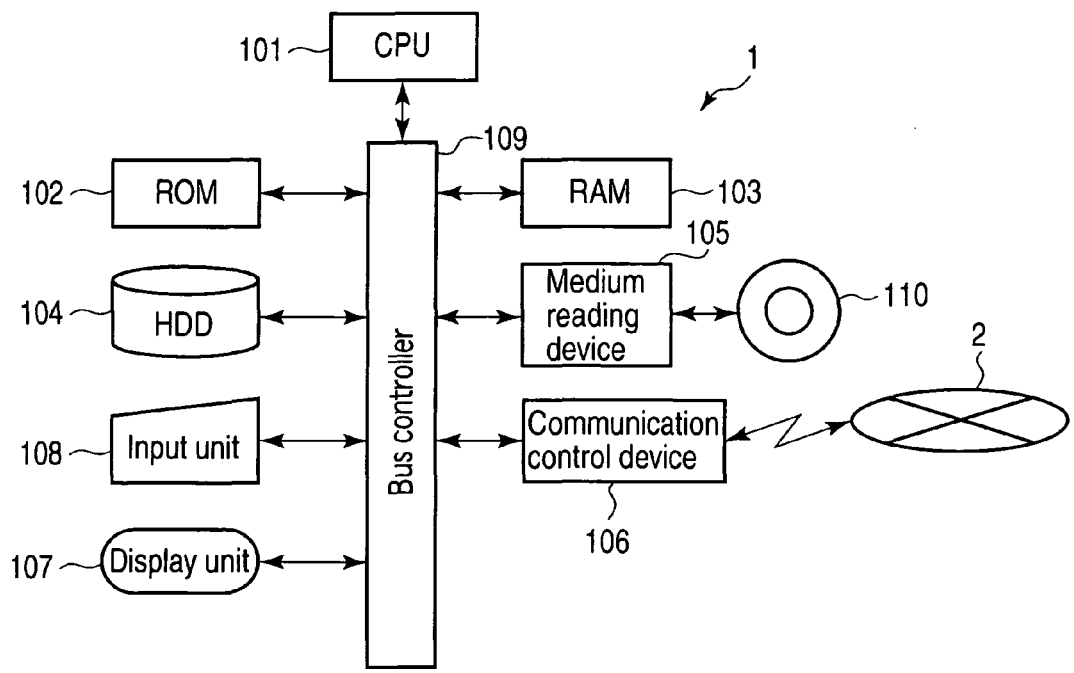
F I G. 2

Problem xx, resolved
　　　　Update on 7/18/2006, at 13:00

Problem xx to which any progress has not been made, but at last, . . . .

F I G. 4 A

Category: News

Title: News xx

Broadcasting hour: 7/18/2006 15:00-15:30

Performers: Ichiro Suzuki, Jiro Tanaka, . . .

Details of program: Finally, problem xx is solved, representative yy is arrested, . . . .

F I G. 4 B

| Topic ID | Topic keyword | Time period | Frequency | Original document ID |
|---|---|---|---|---|
| A | Wrestler xx | 2007/7/11-2007/7/18 | 18 | 001,002,... |
| B | Election of the house of councilors | 2007/7/15-2007/7/29 | 20 | 012,023,... |
| C | ... | | | |

| Topic ID | Keyword | Topic/sub-topic | Time period | Frequency | Original document ID | Former topic |
|---|---|---|---|---|---|---|
| A | Wrestler xx | Topic | 2007/7/11-2007/7/18 | 18 | 001,002,... | |
| A-1 | Championship battling | Former topic | 2007/7/11-2007/7/13 | 7 | 001 | |
| A-2 | Japanese wrestler | Former topic | 2007/7/13-2007/7/16 | 5 | ... | A-1 |
| A-3 | Promotion to ozeki | Former topic | 2007/7/15-2007/7/18 | 4 | ... | A-2 |
| B | Election of the house of councilors | Topic | 2007/7/15-2007/7/29 | 20 | 012,23,... | |
| B-1 | Public announcement | Former topic | 2007/7/15-2007/7/17 | 5 | ... | |
| B-2 | Closely-contested constituency | Former topic | 2007/7/18-2007/7/20 | 3 | ... | B-1 |
| B-3 | New party | Former topic | 2007/7/19-2007/7/22 | 3 | ... | B-1 |
| B-4 | Judgment | Former topic | 2007/7/25-2007/7/27 | ... | ... | B-2 |
| B-5 | Crushing defeat | Former topic | 2007/7/26-2007/7/29 | ... | ... | B-3 |
| ... | | | ... | | | |

FIG. 9

INFORMATION RECOMMENDATION DEVICE AND INFORMATION RECOMMENDATION METHOD

CROSS-REFERENCE TO RELATED APPLICATIONS

This application is based upon and claims the benefit of priority from prior Japanese Patent Application No. 2008-086151, filed Mar. 28, 2008, the entire contents of which are incorporated herein by reference.

BACKGROUND OF THE INVENTION

1. Field of the Invention

The present invention relates to an information recommendation device and an information recommendation method configured to effectively detect and present a document, which is continued from a document browsed by a user in the past, from a document having data and time information as an attribute.

2. Description of the Related Art

Conventionally, various techniques have been developed so as to meet an important need as regards recommending and recognizing topics based on their appeal to users. For instance, in the World Wide Web (WWW), a technique exists which recommends other Web pages related to Web pages included in a browsing history and marked of "interested" for each user, and a technique exists which recommends goods purchased by other users who also purchased goods that the user is interested in.

A means for recommending information based on the user's interest includes, as a rough classification, a form of recommendation by collaboration filtering and a form of recommendation of analogous content items and of the same category. For instance, a technique which tries to predict an evaluation value in a collaboration filtering method is disclosed in JP-A 2003-167901 (KOKAI). Information recommendation based on characteristic vector matching for user's preferences is attempted in JP-A 2006-190128 (KOKAI). This technique, for example, extracts a plurality of characteristic keywords from a document set that is a user's use history, stores these keywords as characteristic vectors, and determines whether or not new content items are content items close to the user's preferences on the basis of whether or not the new content items are similar to the characteristic vectors.

However, as regards the collaboration filtering described in JP-A 2003-167901 (KOKAI), it is needed to use histories of other users in order to perform matching. For instance, in a case in which a content item is recommended for a user A who is interested in a certain topic, the filtering retrieves another user, user B, who is also interested in this topic, and decides a content item to be recommended to the user A based on the content use history of the user B. This kind of technique described in JP-A 2003-167901 (KOKAI) cannot be used in an operation which does not refer (or which is incapable of referring) to the use histories of other users.

In such a system described in JP-A 2006-190128 (KOKAI), based on use histories and preferences of users, in a case in which keywords do not directly coincide with one another like a case in which the same topics are represented by different keywords, a problem such that content items may not be recommended is posed. Even in a case of recommendation based on a category, a case in which a range of a topic showing the category and a range of a user's interest do not coincide with each other may pose a problem.

Further, it comes into question that the foregoing system may not trace a process or a transition of content items in a category as a common topic.

BRIEF SUMMARY OF THE INVENTION

According to an aspect of the invention, there is provided an information recommendation device, comprising: a document input unit which inputs a document set of which each document has date and time information within a specified time period; a document analysis unit which obtains a plurality of characteristic vectors each including a plurality of keywords of vector elements by each keyword analysis of the document set or history documents including browsed documents or documents labeled by bookmark operations; a clustering unit which obtains a plurality of topic clusters and a plurality of sub-topic clusters which are each composed of documents belonging to the same topic by clustering the document set; a topic transition generation unit which generates a transition structure showing transitions of topics among the sub-topic clusters; a characteristic attribute extraction unit which extracts a characteristic attribute of frequently included keyword from each topic cluster and each sub-topic cluster; a cluster-of-interest extraction unit which extracts a cluster-of-interest equivalent to any one of the plurality of topic clusters or sub-topic clusters by similarity determination among the characteristic vectors of the history documents and the characteristic vector of each document included in the document set; a recommended document extraction unit which obtains a sub-topic cluster having transition relations with the cluster-of-interest on the basis of the transition structure owned by the cluster-of-interest, and extracts a document included in the sub-topic cluster as a recommended document; and a recommended document presentation unit which presents the recommended document together with the characteristic attribute.

BRIEF DESCRIPTION OF THE SEVERAL VIEWS OF THE DRAWING

FIG. 1 is an exemplary schematic view depicting an example of a system construction including an information recommendation device of an embodiment;

FIG. 2 is an exemplary hardware configuration view of a server;

FIG. 4A is an exemplary view exemplifying news article on a Web page on the Internet, FIG. 4B is an exemplary view exemplifying information on an electronic program guide (EPG);

FIG. 9 is an exemplary view depicting an example of cluster structure information;

DETAILED DESCRIPTION OF THE INVENTION

Figure 3:
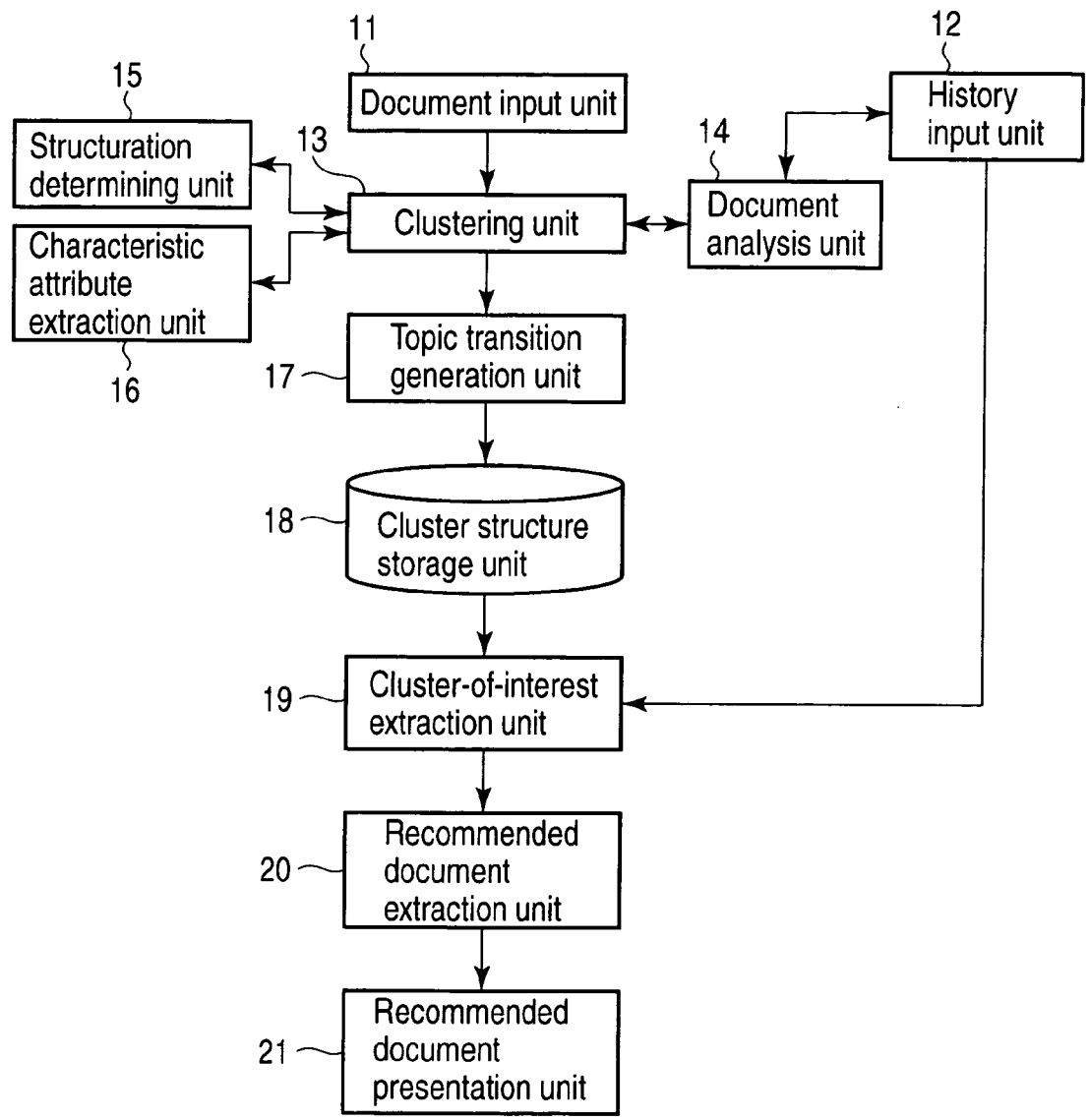
FIG. 3 is an exemplary block diagram depicting a functional configuration of a server.

Hereinafter, embodiments of the invention will be described with reference to the drawings.

As shown in FIG. 1, with respect to an example, a server client system which includes a plurality of client computers (referred to clients) 3 connected to a server computer (refereed to a server) 1 via a network 2 such as a local area network (LAN) is assumed. The server 1 and the client 3 are, for example, generic personal computers.

As shown in FIG. 2, the server 1 includes a central processing unit (CPU) 101; a read only memory (ROM) 102, which is a memory for read only use with a Basic Input/Output system (BIOS) stored therein; a random access memory (RAM) 103 storing a various kinds of data in a rewritable manner; a hard disk drive (HDD) 104 functioning as various databases and storing various programs; a medium reading device 105 such as a CD-ROM drive for storing information, distributing the information outside, and acquiring information from the outside by using a storage medium 110; a communication control device 106 for transmitting information through communication with external other computers via the network 2; a display unit 107 such as a cathode ray tube (CRT) and a liquid crystal display (LCD) displaying a processing process and a result, etc., to an operator (user); and an input unit 108 such as a keyboard and a mouse for inputting a command and information to the CPU 101 by the operator. A bus controller 109 adjusts data transmitted and received among each unit to operate the CPU 101.

In such a server 1 and clients 3, upon activation by a user, the CPU 101 starts a program named as a loader stored in the ROM 102, and reads a program managing hardware and software of a computer named as an operating system (OS) from the HDD 104 into the RAM 103 to start the OS. The OS starts programs, reads information and stores the information in response to operations by the user. As regards a representative OS, Windows (registered trademark) is well known. A program operating on the OS is refereed to as "an application program". The application program is not limited to one operating on the OS, and an application program may make the OS shoulder execution of a part of various kinds of processing described below, or may be included within a group of program files composed of prescribed application software and the OS.

The server 1 stores an information recommendation program of an embodiment in the HDD 104. In this meaning, the HDD 104 functions as a storage medium storing the information recommendation program. Generally, the application program to be installed in the HDD 104 is recorded on the storage medium 110 including an optical disk such as a CD-ROM and a DVD, a magnetic disk such as a magneto optical disk and a flexible disk, and a semiconductor memory. An operation program recorded on the storage medium 110 is installed in the HDD 104. Therefore, the storage medium 110 with portability, for example, an optical information recording medium such as a CD-ROM, and a magnetic medium such as a FD may become a recording medium in order to store the application program. Further, the application program may be taken in from the outside, for example, through the communication control device 106 to be installed in the HDD 104.

When the information recommendation program operating on the OS starts, in the server 1, the CPU 101 executes various kinds of computing processing in accordance with the recommendation program and intensively controls each of the above units. Characteristic processing of the embodiment of the various kinds of computing processing executed by the CPU 101 in the server 1 will be described hereinafter.

As shown in FIG. 3, the server 1 comprises a document input unit 11, a history input unit 12, a clustering unit 13, a document analysis unit 14, a structuration determining unit 15, a characteristic attribute extraction unit 16, a topic transition generation unit 17, a cluster structure storage unit 18, a cluster-of-interest extraction unit 19, a recommended document extraction unit 20, and a recommended document presentation unit 21. The cluster structure storage unit 18 may be composed of various storage means, such as the HDD 104, storage medium 110 and RAM 103, which are in general use.

The following will describe each functional block. A concrete data structure and processing procedure related to each of the functional blocks will be described later.

The document input unit 11 inputs a document including date and time information as an attribute, and receives inputs of various documents (refereed to as a document set) having data and time within a specified time period of the prescribed number of days as an attribute. The document having the date and time information as the attribute includes, for example, a news article on a Web page on the Internet (refer to FIG. 4A), a rich site summary (RSS) (a summary of newly obtained information and articles on a Web page), and information on an electronic program guide (EPG) (refer to FIG. 4B). In all of the documents, it is necessary to include the date and time information as an attribute of a body text, or an update time. As regards a distribution source of these documents, a specified Web site and a database are used. Although not shown, document IDs uniquely identify each of the articles on the Web page (refer to FIG. 4A) and the information on the EPG (refer to FIG. 4B). That is, the documents input in the input unit 11 include a message such as an E-mail and an instant messenger, a metadata text accompanying program video data such as EPG information and subtitle information in addition to a Web page showing a news article, a diary, a Weblog, an RSS, etc., which can be acquired from a Web. In other words, in a case of treatment of program video data as a document, since the date and time information cannot be obtained from the video data itself, the date and time information is acquired from the metadata text.

The history input unit 12 receives an input of a history of documents browsed by the user or a history of documents to which labels are attached through bookmark operations. In the embodiment, each user has a unique user ID. The operation history of the browsing or the bookmark by the Web browser is associated with the user ID continuously or periodically and uploaded to the server 1.

The clustering unit 13 extracts a topic cluster having one or a plurality of documents, belonging to the identical topic, as elements, with respect to the document set in the specified time period input through the document input unit 11. That is, upon receiving the document set from the input unit 11, the clustering unit 13 transfers the document set to the document analysis unit 14 once. As regards an example of a generation method of the topic cluster, processing can be used, in which the clustering unit 13 uses the keyword obtained by the analysis through the document analysis unit 14, assumes each document as a word vector, and assumes a set of documents which make inner products of the word vectors indicating the respective documents maximum as documents belonging to the identical topic, and is repeated while determining the thresholds of the inner products. Such a clustering unit 13 may obtain the set of the topic clusters.

The analysis unit 14 receives the document set from the document input unit 11 or clustering unit 13, uses the existing natural language processing technique (e.g., morphological analysis, n-gram extraction, etc.), and analyzes representative keywords included in the text on the Web or the text of the EPG. For instance, applying the morphological analysis to a character string "nature language processing" enables cutting out words such as "natural", "language" "processing" as keywords. Weighting each keyword may be performed by using a term frequency (TF) and an inversed document frequency (IDF) calculated from the number of documents and a frequency of appearance of the keywords. The values of the calculated TF and IDF are utilized for each element of the foregoing word vectors.

The structuration determining unit 15 determines whether or not a topic showing one topic cluster should be segmentalized into a plurality of topics (sub-topics). As regards determination references of the topic structuration, for example, the number of documents consisting of the topic cluster, a distribution of dates included in the document, values of C-values of the keywords included in the document, etc., may be used. The C-value is described in the document of "K. Frantsi and S. Ananiadou, 'Extracting Nested Collocations,' in Proceedings of International Conference on Computational Linguistics (COLING-96), pp. 41-46, 1996". If these values exceed the thresholds, the determining unit 15 determines that the topic cluster may be segmentalized. In this case, the determining unit 15 controls the clustering unit 13 (and the document analysis unit 14) so that the document sets belonging to the topic cluster are recursively applied with the processing of the cluster generation. Therefore, for the topic clusters or the sub-topic clusters, the topic clusters are repeatedly extracted until it is determined that the topics, which are each shown by the threshold determinations, cannot be structured any more. Thereby, a sub-topic cluster with a hierarchical structure is generated. However, it is assumed that the topic keyword itself, which has been used in original clustering, is not used for calculation in the processing of segmentalization of the topic cluster into the sub-topic clusters.

The characteristic attribute extraction unit 16 extracts frequently included keywords, as the topic keywords, with respect to each of the topic clusters extracted by the clustering unit 13. Although a reference indicating how long the cluster should be extracted as a keyword is necessary, it is possible, for example, to use a method utilizing the C-value.

The topic transition generation unit 17 generates the transition structure of the topic on the basis of the relations between the topic cluster and the sub-topic cluster extracted by means of the clustering unit 13.

The characteristic attribute extraction unit 18 stores the topic for each topic cluster extracted by the clustering unit 13, the characteristic for each topic extracted by the extraction unit 16, and the topic transition structure generated from the generation unit 17.

The cluster-of-interest extraction unit 19 associates the cluster structure stored in the storage unit 18 with the history input by the history input unit 12, and then, determines which of topics or sub-topics correspond to the set of the documents browsed by the user or marked as "interested" by the user.

The recommended document extraction unit 20 extracts a document to be recommended in response to the topics or sub-topics to be associated with the history extracted by means of the cluster extraction unit 19.

The recommended document presentation unit 21 presents the document selected by the recommended document extraction unit 20 to the user by associating the selected document with the structures of the topic and the sub-topic. The presentation method used generates, for example, the selected documents as a Web page and presents it in response to a display request from the client 3 to be used by each user via the network 2.

The topic cluster extraction processing performed by the clustering unit 13 and the document analysis unit 14 of the processing to be executed by the CPU 101 of the server 1 in accordance with the information recommendation program will be described by referring to the flowchart of FIG. 5.

Figure 5:
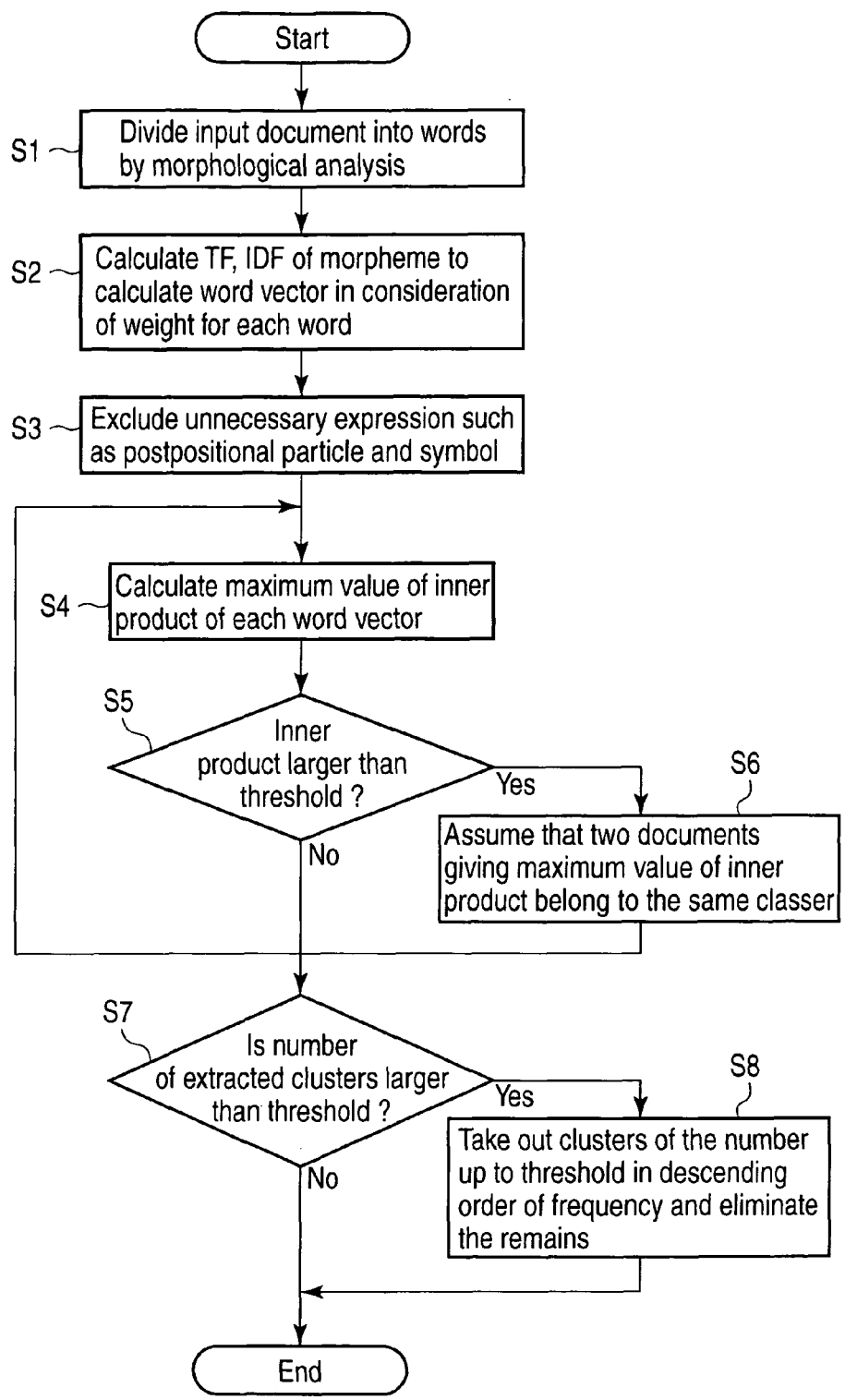
FIG. 5 is an exemplary flowchart depicting a processing procedure of topic cluster extraction.

As shown in FIG. 5, the document analysis unit 14 firstly applies the morphological analysis to each of the plurality of documents of which the inputs are received through the document input unit 11 within the specified time period and segmentalizes the documents into morphemes (words) (Step S1). The analysis unit 14 generates a word vector for each document in consideration of the weight for each word by calculating the TF and IDF values of the morphemes obtained by the segmentalization (Step S2). The analysis unit 14 excludes useless expressions not to be used as the keywords as postpositional particles out of candidates of the keywords generated in Step S2 (Step S3).

A word list equivalent to the analysis result of one document produced by the document analysis unit 14 from Step 1 to Step 3 is returned to the clustering unit 13.

The clustering unit 13 obtains a combination of two documents, calculates a maximum value of an inner product of each word vector for the two documents (Step S4), and determines whether or not the maximum values exceed the threshold (Step S5).

While in the embodiment, the clustering unit 13 has calculated a score by using appearance frequencies that are attributes of the document set and the keywords themselves, the invention is not limited to this embodiment, the a score may be calculated by using the lengths of the keywords and the attributes of the keywords themselves of the document set, such as morpheme information.

If the maximum values of the inner products of the word vectors are larger than the threshold (Yes, Step S5), it is assumed that the two documents giving the maximum values belong to the same cluster (Step S6). The processing in Step S4 is repeatedly executed.

If the maximum values of the inner products of the word vectors do not exceed the threshold (No, Step S5), the clustering processing is terminated, and it is determined whether the number of clusters is larger than the threshold (Step S7). If the number is larger than the threshold, the clusters of the number up to the threshold in descending order of frequencies are left, and the remains are eliminated (Step S8). The topic cluster may be obtained through the processing so far.

Figure 6:
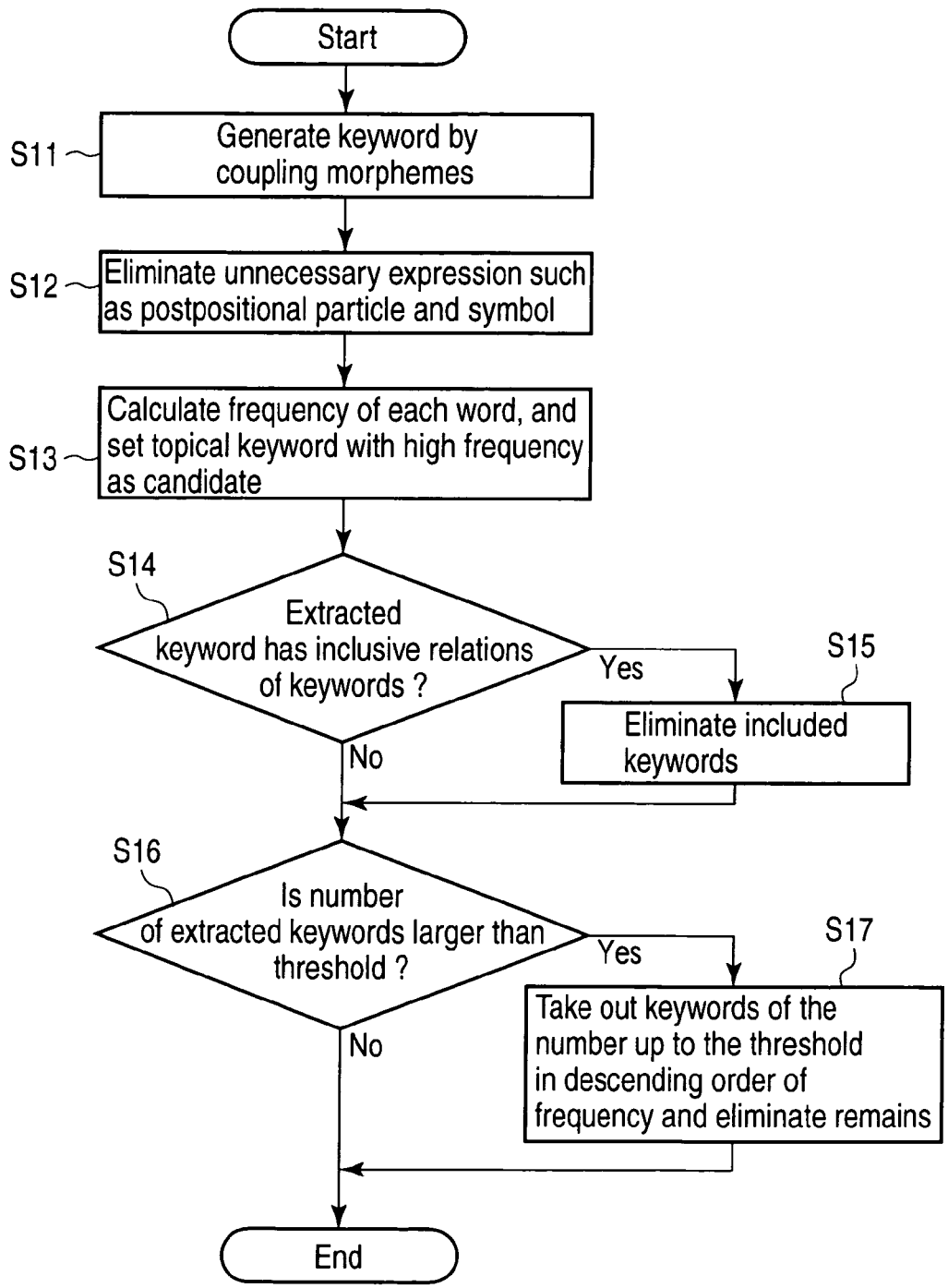
FIG. 6 is an exemplary flowchart depicting a processing procedure of keyword extraction.

The following will describe the processing procedure for extracting the keyword representing the topic for each topic cluster by means of the characteristic attribute extraction unit 16 with reference to the flowchart of FIG. 6.

As shown in FIG. 6, the extraction unit 16 firstly couples a plurality of morphemes obtained as the processing results by the document analysis unit 14 and then generates candidates of the keywords consisting of two or more words (Step S11). Next, unnecessary expressions, such as postpositional particles and symbols, not to be used as the keywords are eliminated from the candidates of the keywords generated from Step S11 (Step S12).

The characteristic attribute extraction unit 16 calculates the appearance frequency of each word, and sets current event keywords as candidates of topical keywords in descending order of the appearance frequency (Step S13). The extraction unit 16 may calculate the appearance frequencies of the keywords by using together the history of the appearance frequencies of the previously calculated keywords. Thereby, it is determined whether or not a plurality of keywords extracted as the candidates have inclusive relations of the character string (Step S14). In the embodiment, while the characteristic attribute extraction unit 16 calculates the score by using the appearance frequencies of the attributes of the keywords themselves in the document set, the invention is not limited to this embodiment; the extraction unit 16 may calculate the score by using the attributes, such as lengths of the keywords and the morpheme information, of the keywords themselves in the document set. As long as any attribute can be expressed as a characteristic quantity, the attribute is not always limited to those of the keywords.

If the keywords have the inclusive relations of the character string (Yes, Step S14), the keywords to be included are eliminated (Step S15). As regards a case in which there are inclusive relations in the character strings of the keywords, for example, as regards keywords that are "problem xx", "xx" and "problem", since there are inclusive relations among the "problem xx", the "xx", included keywords "xx" and "problem" are eliminated in Step S15. Meanwhile, if there is no inclusive relation in the character string of the keywords (No, Step S14), the extraction unit 16 advances to Step S16, as it is.

As mentioned above, the extraction unit 16 extracts the keywords by using the inclusive relations of each keyword analyzed by the document analysis unit 14. While the list of the keywords obtained in this way becomes a set of the topic keywords representing the topics, if the number of the extracted keywords is larger than the prescribed threshold (Yes, Step S16), the extraction unit 16 adopts the keywords of the number equivalent to the threshold in descending order of frequency, and eliminates the remains (Step S17).

Figures 7, 8:
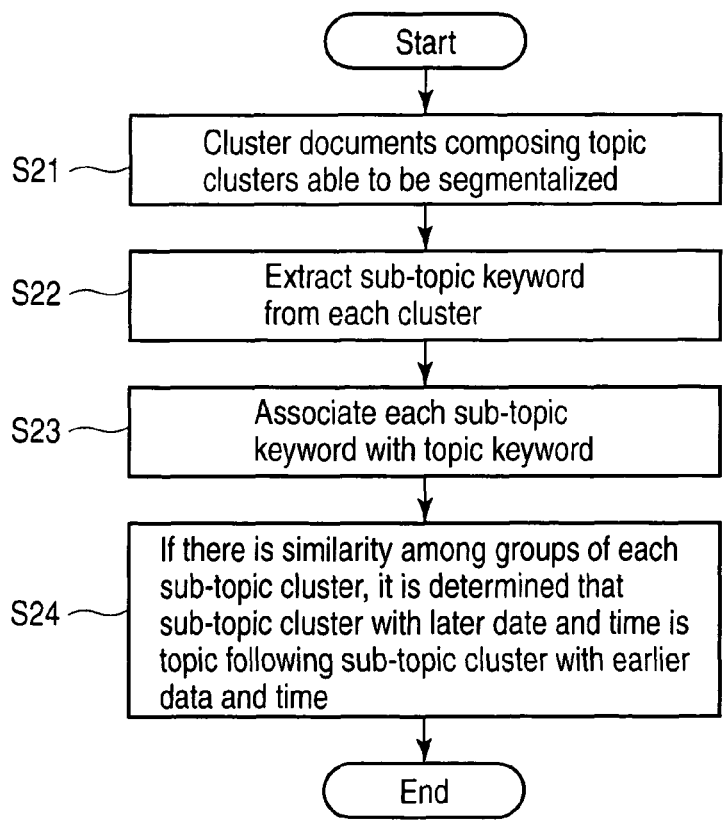
FIG. 7 is an exemplary schematic view depicting a Data structure of a topic keyword list.
FIG. 8 is an exemplary flowchart depicting a processing procedure of structuration of a topic keyword.

FIG. 7 shows a data structure of the extracted topic keyword list. As shown in FIG. 7, each topic ID 70 has a (specified) period 72, an appearance frequency 73, and an ID 74 of an appearance original document as attributes in addition to a character string 71 of the keyword itself.

If it is determined that the topic may be segmentalized by the structuration determining unit 15, it is assumed that the topic (cluster) which is further segmentalized by the clustering unit 13 is referred to as "a sub-topic (cluster)", and the keyword which is representative of the sub-topic (cluster) is referred to as "sub-topic keyword". The processing procedure of the transition generation of the topic and the sub-topic through the topic transition generation unit 17 will be described with reference to the flowchart of FIG. 8.

As shown in FIG. 8, the generation unit 17 firstly performs clustering by the clustering unit 13 depending on the input of the documents composing of the topic cluster which can be segmentalized (Step S21). At this time, the topic keywords composed of the topic cluster itself during processing are not included for calculation. As regards the sub-topic, closeness of dates is used for calculation so that the sub-topics with close dates are highly likely to belong to the same cluster.

The extraction unit 16 extracts the sub-topic keyword from the sub-topic cluster obtained as the clustering result in Step S21 (Step S22).

The generation unit 17 sets each obtained sub-topic keyword group as a small headline, and associates it with a topic keyword (set as a headline) indicating the topic cluster before segmentalization (Step S23). The differentiation between the headline and the small headline is reflected to a display upon the below mentioned recommendation document presentation.

If the clusters are similar to one another in the group of the sub-topic clusters, the topic transition generation unit 17 determines that the sub-topic cluster of the later date and time is the topic which follows the sub-topic cluster of the prior time and date (Step S24). The processing of obtaining the transition structure, for example, may calculate an averaged characteristic vector to be a center of gravity of the sub-topic cluster, and determine that the sub-topics are similar to one another if those Euclidean distances are not more than the threshold, and if the cosine scale of averaged characteristic vector is not less than the threshold. Methods of similarity determination among the clusters are not limited to the above methods. Also, as anteroposterior relations of date and time, a method for selecting a document with the earliest date and time, and a method for selecting a document with the averaged date and time are possible approaches. Methods other than the foregoing methods can be used.

FIG. 9 shows an example of the cluster structure information acquired as the result of the above processing. Attributes (keyword 91, differentiation among topics and sub-topics 92, appearance time period 93, appearance frequency 94, ID of appearance original document 95, ID [transition structure] of prior topic 96) added upon extracting the topic cluster or the sub-topic cluster are given to each topic and sub-topic to be identified by the topic ID 90. The data described above is stored in the cluster structure storage unit 18.

Figure 10:
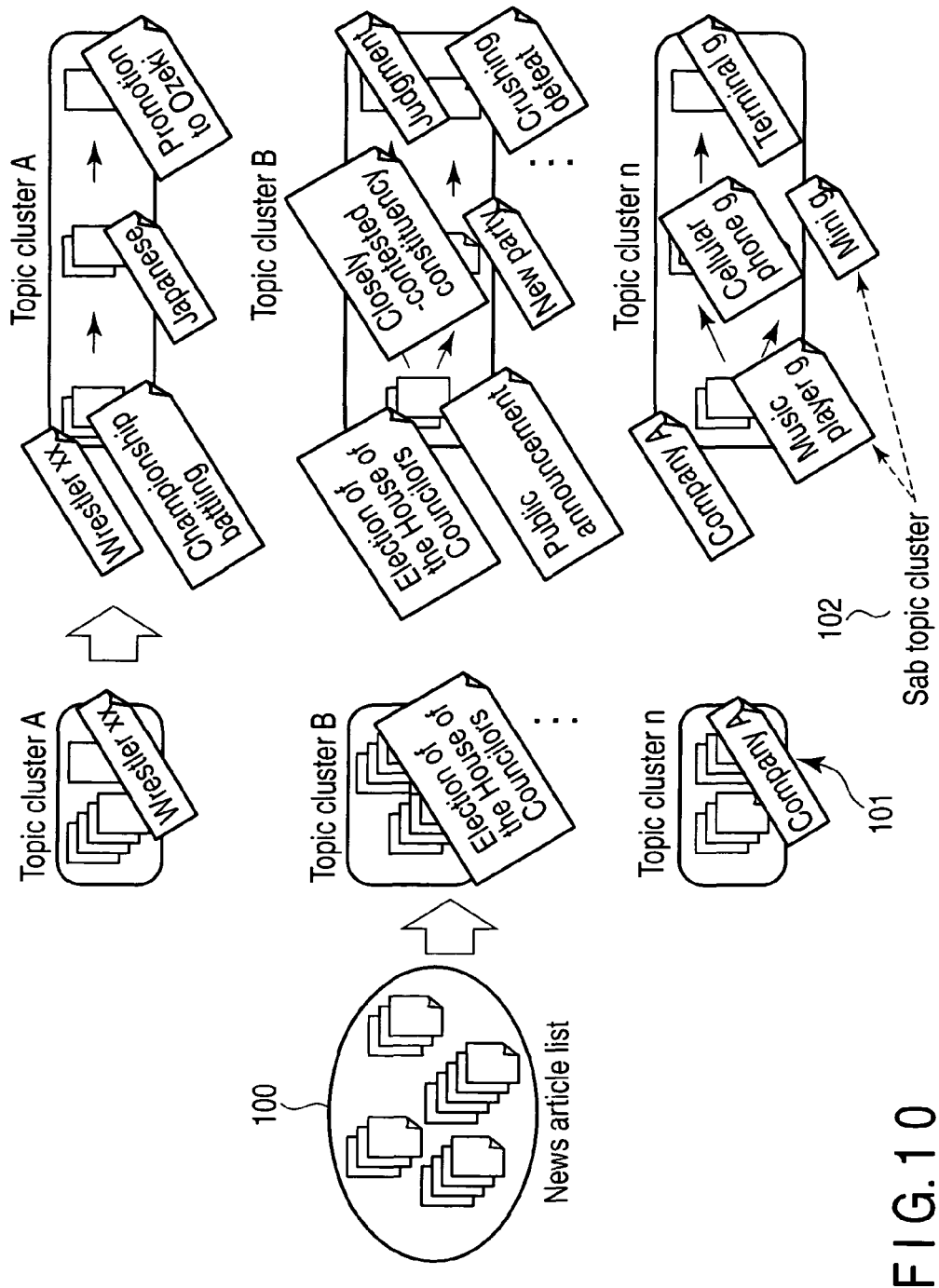
FIG. 10 is an exemplary view depicting an example of a clustering result.

FIG. 10 schematically shows the clustering result corresponding to the result shown in FIG. 9. An input document set 100 (e.g., news article list) is classified into a topic cluster 101 and a sub-topic cluster 102. FIG. 10 shows that a transition structure corresponding to the similarity of the sub-topic has been formed.

Figure 11:
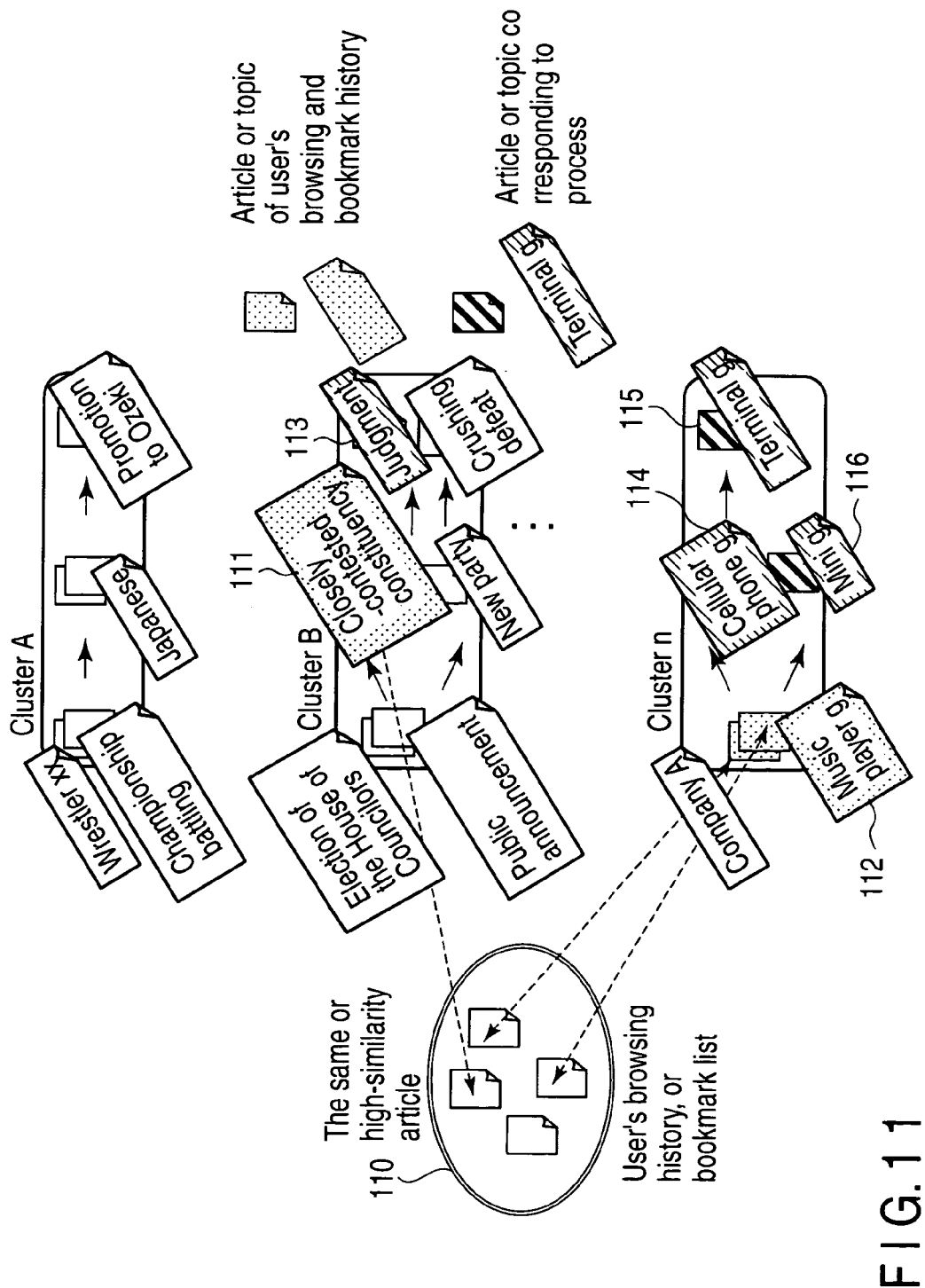
FIG. 11 is an exemplary schematic view associating a browsing and bookmarking history of a user with a sub-topic cluster, and extracting a topic showing its transition.

The processing of the cluster-of-interest extraction unit 19 and the recommended document extraction unit 20 will be described with reference to FIG. 11. At first, the document set 110, which is input by the history input unit 12 and which is user's browsing result documents or a history with label, such as bookmark, attached thereto, is input. To acquire information to which the interests of the user who has been using the information recommendation device, the history is input to the device. In the embodiment, the document to be input as the document describing the history includes a message such as an E-mail and instant messenger, and metadata text accompanying the program video data such as EPG information and subtitle information in addition to the data showing the news article, diary, Weblog, RSS, etc., capable of being acquired from the Web page. Further, the document to be input includes date and time information to be obtained by some user operations which are performed on the text information, such as browsing time of electronic documents or presentation materials, and bookmark times the Web pages in addition to these items of text data fundamentally accompanied by the date and time information.

For instance, if the bookmark result list 110 of the user is input in the history input unit 12, the document analysis unit 14 calculates a characteristic vector for each document corresponding to each bookmark. The cluster-of-interest extraction unit 19 determines the similarity between each characteristic vector and word vectors (characteristic vectors) of each topic cluster and sub-topic cluster stored in the cluster structure storage unit 18 and then extracts the topic cluster or sub-topic cluster related to the bookmark held by the user as the cluster-of-interest. For instance, in FIG. 11, a sub-topic cluster "closely-contested constituency" 111 included in a topic cluster B and a sub-topic cluster "music player g" 112 included in a topic cluster n are each extracted as the clusters-of-interest. While the embodiment has described the case in which the similarity of the characteristic vectors has been used in order to extract the clusters-of-interest, a method that simply checks coincidences of URLs of the identical Web pages and the viewed programs can be used.

The recommended document extraction unit 20 extracts a document equivalent to "continuation" of the topic to be shown by the topic cluster extracted by the cluster-of-interest extraction unit 19 as the recommended document. For instance, the sub-topic clusters to be recommended to the user in the example of FIG. 11 are documents that are shown by hatched lines, such as a "judgment" 113, a "cellular phone g" 114, a "terminal g" 115 and a "mini g" 116, which correspond to the continuations of the sub-topic clusters. As regards bookmarks not related to the sub-topic clusters in the document set 110, the recommended document extraction unit 20 may check relations with an entire topic cluster, and if there is any relation, new bookmarks, for example, which belong to the related topic clusters, and leave intervals not shorter than a prescribed time period from the bookmarked documents, and may set an entire topic cluster as recommendation objects. Regardless, when simply recommending documents of which the appearance frequencies of words are similar to the past history, the documents belonging to the same topic may be recommended; however a transition may be recognized for each topic by setting the topic cluster and sub-topic cluster as a start point for a comparison.

The recommended documents extracted by the document extraction unit 20 in this way are presented to the user through the recommended document presentation unit 21. An example of the recommendation by the presentation unit 21 will be described by referring to FIG. 12.

Figure 12:
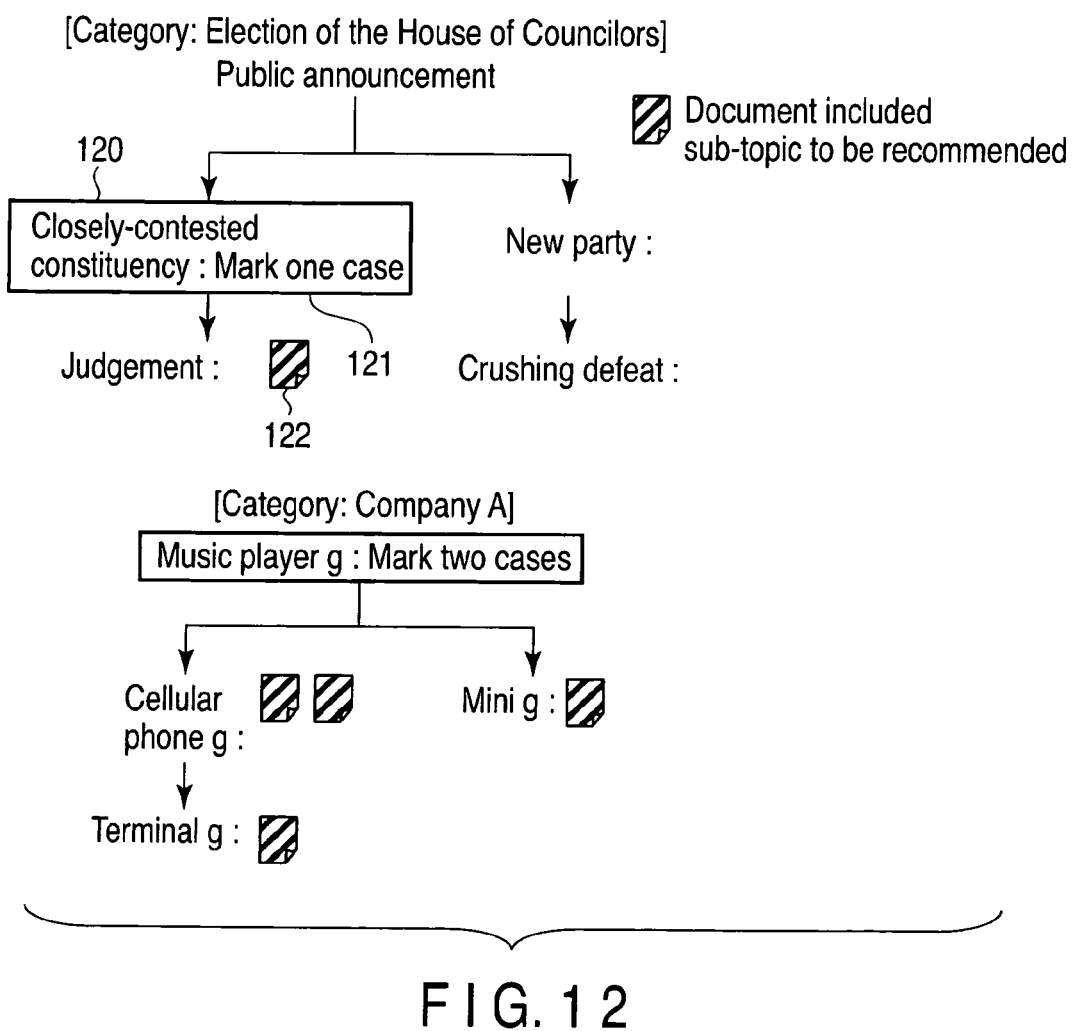
FIG. 12 is an exemplary schematic view depicting a correspondence (a reason) between the browsing and bookmarking history of the user to the topic, and a process of the topic.

The transition of an entire topic related to the documents bookmarked by the user is displayed. For instance, in a case of a topic "election of the House of Councilors", a transition starting from "public announcement" to "closely-contested constituency→judgment", "new party→crushing defeat" is presented. Then, a display such as "x item mark" is given to the topic cluster or sub-topic cluster corresponding to the document bookmarked by the user. In the example of FIG. 12, for example, "1 item mark" 121 is given to a "closely-contested constituency" 120.

The recommended document (an icon thereof) is highlighted to display (e.g., recommended document "judgment" 122). Unrecommended documents are also displayed in a manner of unhighlighted display in response to the sub-topics. While the embodiment has displayed all the documents belonging to the topic, only the recommended documents may be displayed. As regards a method for highlighted display, an arbitrary method, for example, for distinguishing by size or color, for displaying a summary or a part of the document can be used.

A recommendation method may cooperate with equipment accompanying documents and operations of services, for example, works with a recording reservation function in a case that the document is a television broadcast program, and displays a purchase menu in a case that the document is goods, in addition to execution of a presentation of the document.

As regards the display order of each document, it is assumed that a display order may be changed in accordance with the number of documents included in each topic and sub-topic, the number of bookmarks made by the user, and the attribute of newness of the topics. As regards the documents to be displayed, not only the documents, which are input by the input unit 11 in advance, but also, for example, Web retrieval results topics or sub-topics to be displayed as results caused by the representative keywords which have become headlines of topics or sub-topics, may be displayed. In this case, a method for displaying the documents by selecting the topics which have been displayed or the keywords of the sub-topics is a possible approach.

According to this embodiment described above, the information recommendation device generates a topic structure which is hierarchized on the basis of sub-topics obtained by analyzing the keywords included in the document information of which the input has been received within a specified time period, classifying each analyzed topic, and clustering the documents again. The transition structure of the topics is configured by using the relations among the similarities and the dates and times of the sub-topics. For the transition structure of the topics, it is determined which of the topics and sub-topics correspond to the documents bookmarked in the past by the user, and the device presents the documents corresponding to the continuations of the topics together with the transition structure of the topics. Thereby, the device may effectively recommend the documents to the user together with changes in advance and state of the topics which were browsed or labeled in the past regardless of any direct similarity to the bookmarked documents.

That is, the embodiment records the documents such as Web pages that are browsed every day, and documents of the program table information of the television broadcast programs that are distributed every day, calculates how each of the keywords has appeared, frequency and newness, and generates the cluster structure for recognizing the topics. The device of the embodiment easily understand what is a topic currently appeared and a representative keyword, how the topic has been undergoing a transition, and may present a document equivalent to the "continuation" of such a topic on the basis of the history of the labeling such as previous browsing and bookmark operations by the user.

While the embodiment has been described in the case in which the recommended document presentation unit 21 presents the documents extracted by the recommended document extraction unit 20 in response to display requests from each client 3 to be used by each user via the network 2, the invention is not limited to this embodiment. For instance, the device may download a Web page in advance onto each client 3 to be used by each user, and display a local file equivalent to the result of the download.

While the embodiment has used a clustering system called "hierarchy type clustering" which generates clusters by firstly collecting analogous documents, conversely, it makes it possible to use a system called "non-hierarchy type clustering" which generates clusters by dividing all the documents. As regards the timing to conduct the clustering, a method for adding only newly added documents may use together in addition to a system of generating all clusters at every time.

Figure 13:
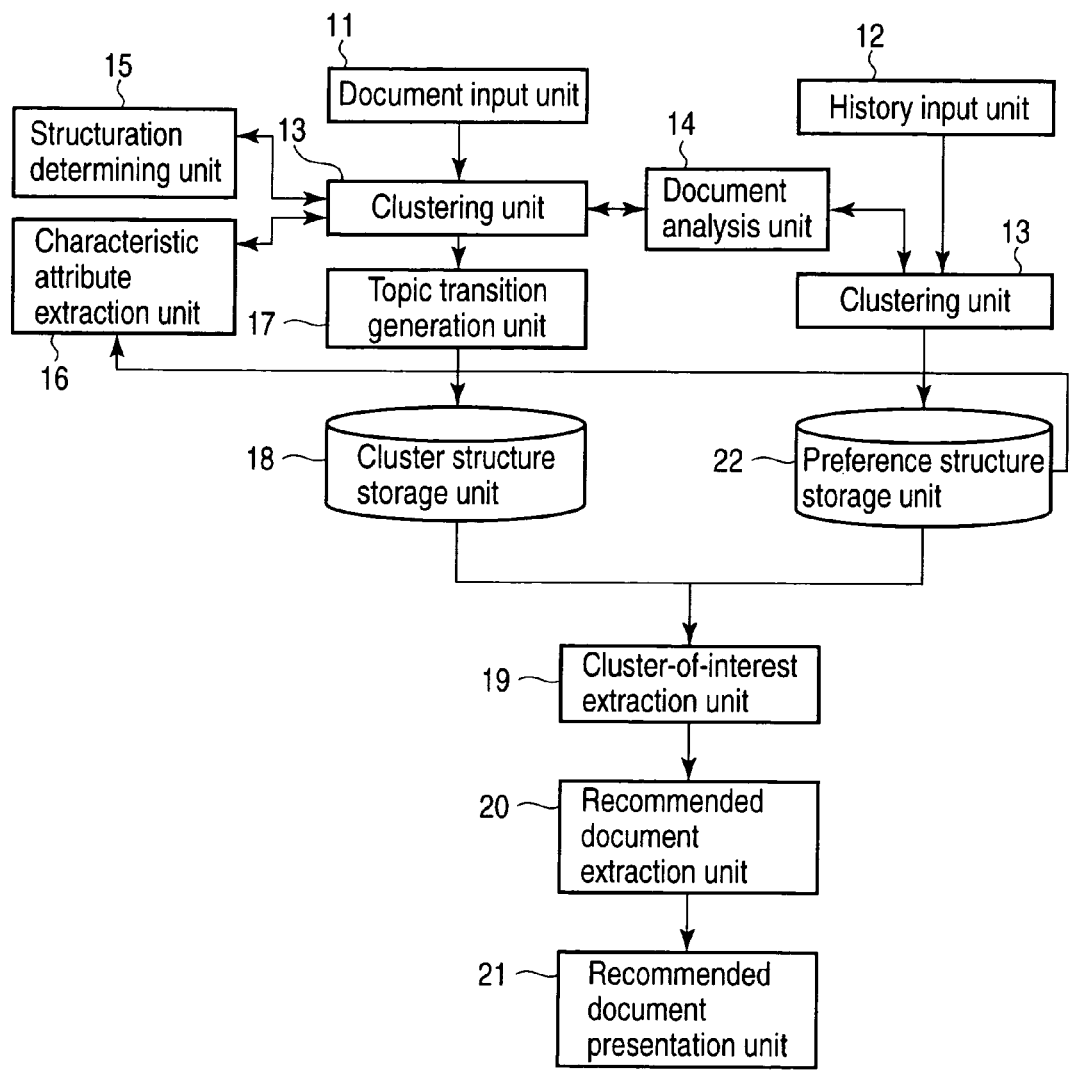
FIG. 13 is an exemplary view in a case of use of classification based on the user's history.

As shown in FIG. 13, the information recommendation device may be configured to perform clustering processing for the document set input by the history input unit 12, require a preference structure similar to the cluster structure stored in the cluster structure storage unit 18, and store the preference structure in the preference configuration storage unit 22. In this case, the cluster-of-interest extraction unit 19 may specify the recommended document by comparing the cluster structures of the topics and sub-topics stored in the cluster structure storage unit 18 with the preference structure stored in the storage unit 22. For instance, the recommendation device becomes able to recommend the document corresponding to the "continuation" of the corresponding-topic while showing a change (a transition) in preference and interest of the user. It is preferable for the document analysis unit 14 to perform the document analysis on the preference structure stored in the storage unit 22. In this case, the analysis unit 14 weights the recommended document on the basis of the user's preference by calculating the foregoing TF and IDF.

While the embodiment has assumed a server client system in which the plurality of clients 3 are connected to the server 1 that is the information recommendation device via the network 2, the invention is not limited to the embodiment, and the entire device may be used in a stand-alone state. While the embodiment has individually managed the history information of the users for each user ID, the invention may share the history information for a plurality of users.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recommendation device, comprising:
   a document input unit which inputs a document set of which each document has date and time information within a specified time period;
   a document analysis unit which obtains a plurality of characteristic vectors each including a plurality of keywords of vector elements by each keyword analyses of the document set or history documents including browsed documents or documents labeled by bookmark operations;
   a clustering unit which obtains a plurality of topic clusters and a plurality of sub-topic clusters which are each composed of documents belonging to the same topic by clustering the document set;
   a topic transition generation unit which generates a transition structure showing transitions of topics among the sub-topic clusters;
   a characteristic attribute extraction unit which extracts a characteristic attribute of frequently included keyword from each topic cluster and each sub-topic cluster;
   a cluster-of-interest extraction unit which extracts a cluster-of-interest equivalent to any one of the plurality of topic clusters or sub-topic clusters by similarity determination among the characteristic vectors of history documents and the characteristic vector of each document included in the document set;
   a recommended document extraction unit which obtains a sub-topic cluster having transition relations with the cluster-of-interest on the basis of the transition structure owned by the cluster-of-interest, and extracts a document included in the sub-topic cluster as a recommended document; and
   a recommended document presentation unit which presents the recommended document together with the characteristic attribute.

2. The device according to claim 1, further comprising: a history input unit which inputs the history documents.

3. The device according to claim 1, further comprising: a structuration determining unit which determines whether or not each of the plurality of topic clusters is configured to structuralize for further clustering each of the topic clusters into sub-topic clusters, and if it is configured to structuralize therefor, clusters the topic clusters, and controls the clustering unit so as to obtain the plurality of sub-topic clusters.

4. The device according to claim 1, further comprising: a cluster structure storage unit which stores cluster structure information including the characteristic attribute and the transition structure.

5. The device according to claim 1, wherein the document set includes a document which has date and time information at the document itself and a document in which metadata accompanying the document has date and time information.

6. The device according to claim 1, wherein the clustering unit obtains an inner product value for a group of characteristic vectors corresponding to a set of arbitrary documents, and performs clustering on the basis of threshold determination of the inner product value.

7. The device according to claim 1, wherein the topic transition generation unit obtains similarity among documents included in the topic cluster and documents included in the sub-topic cluster, or relations among date and time information of documents included in the topic cluster and date and time information of documents included in the sub-topic cluster, and then, generates the transition structure.

8. The device according to claim 1, further comprising:
   a preference structure storage unit which stores a preference structure based on the plurality of history documents, wherein
   the clustering unit performs clustering for the plurality of history documents;
   the preference structure storage unit stores the preference structure based on results of the clustering; and
   the cluster-of-interest extraction unit extracts a cluster-of-interest in comparison between the preference structure and the cluster structure information.

9. The device according to claim 8, wherein the document analysis unit performs document analysis of each of the plurality of history documents, and weights preferences on the basis of the results of the document analyses.

10. An information recommendation method, comprising:
    inputting a document set of which each document has date and time information within a specified time period;
    obtaining a plurality of characteristic vectors which each include a plurality of keywords of vector elements by each keyword analyses of the document set or history documents including browsed documents or documents labeled by bookmark operations;
    obtaining a plurality of topic clusters and a plurality of sub-topic clusters which are each composed of documents belonging to the same topic by clustering the document set;
    generating a transition structure which shows transitions of topics among the sub-topic clusters;
    extracting a characteristic attribute from each topic cluster and each sub-topic cluster;
    extracting a cluster-of-interest equivalent to any one of the plurality of topic clusters or sub-topic clusters by similarity determination among characteristic vectors of the history documents and characteristic vector of each document included in the document set;
    obtaining a sub-topic cluster which has transition relations with the cluster-of-interest on the basis of the transition structure owned by the cluster-of-interest, and extracting a document included in the sub-topic cluster as a recommended document; and
    presenting the recommended document together with the characteristic attribute.

11. The method according to claim 10, further comprising: inputting the history documents.

12. The device according to claim 10, further comprising: determining whether or not each of the plurality of topic clusters is configured to structuralize for further clustering each of the topic clusters into sub-topic clusters, and if it is configured to structuralize therefor, clustering the topic clusters, and controlling the clustering so as to obtain the plurality of sub-topic clusters.

13. The method according to claim 10, further comprising: storing cluster structure information which includes the characteristic attribute and the transition structure.

14. The method according to claim 10, wherein the document set includes a document which has date and time information within the document and a document in which metadata accompanying the document has date and time information.

15. The method according to claim 10, further comprising: obtaining an inner product value for a group of characteristic vectors corresponding to a set of arbitrary documents, and clustering on the basis of threshold determination of the inner product value.

16. The method according to claim 10, further comprising: obtaining similarity among documents included in the topic cluster and documents included in the sub-topic cluster, or relations among date and time information of documents included in the topic cluster and date and time information of documents included in the sub-topic cluster, and then, generating the transition structure.

17. The method according to claim 10, further comprising:
storing a preference structure based on the plurality of history documents;
clustering for the plurality of history documents;
storing the preference structure based on results of the clustering; and
extracting a cluster-of-interest in comparison between the preference structure and the cluster structure information.

18. The method according to claim 17, further comprising: performing each document analysis of the plurality of history documents, and weighting preferences on the basis of the results of the document analyses.

19. A non-transitory computer readable medium including an information recommendation computer executable program, program, when executed by a computer, causes the computer to perform a method comprising:
the computer to input a document set of which each document has date and time information within a specified time period;
instructing the computer to obtain a plurality of characteristic vectors each including a plurality of keywords of vector elements by each keyword analyses of the document set or history documents including browsed documents or documents labeled by bookmark operations;
instructing the computer to obtain a plurality of topic clusters and a plurality of sub-topic clusters which are each composed of documents belonging to the same topic by clustering the document set;
instructing the computer to generate a transition structure showing transitions of topics among the sub-topic clusters;
instructing the computer to extract a characteristic attribute of frequently included keyword from each topic cluster and each sub-topic cluster;
instructing the computer to extract a cluster-of-interest equivalent to any one of the plurality of topic clusters or sub-topic clusters by similarity determination among the characteristic vectors of the history documents and the characteristic vector of each document included in the document set;
instructing the computer to obtain a sub-topic cluster having transition relations with the cluster-of-interest on the basis of the transition structure owned by the cluster-of-interest, and extract a document included in the sub-topic cluster as a recommended document; and
instructing the computer to present the recommended document together with the characteristic attribute.

* * * * *